US012615676B2

(12) United States Patent
Yan

(10) Patent No.: US 12,615,676 B2
(45) Date of Patent: Apr. 28, 2026

(54) WI-FI P2P CONNECTION METHOD, ELECTRONIC DEVICE, PROGRAM PRODUCT, AND MEDIUM

(71) Applicant: Honor Device Co., Ltd., Shenzhen (CN)

(72) Inventor: Shenghui Yan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 391 days.

(21) Appl. No.: 18/039,044

(22) PCT Filed: Sep. 1, 2022

(86) PCT No.: PCT/CN2022/116527
§ 371 (c)(1),
(2) Date: May 26, 2023

(87) PCT Pub. No.: WO2023/061093
PCT Pub. Date: Apr. 20, 2023

(65) Prior Publication Data
US 2024/0098816 A1 Mar. 21, 2024

(30) Foreign Application Priority Data

Oct. 14, 2021 (CN) .......................... 202111197472.7

(51) Int. Cl.
*H04W 76/14* (2018.01)
*H04W 84/12* (2009.01)
(52) U.S. Cl.
CPC ............ *H04W 76/14* (2018.02); *H04W 84/12* (2013.01)

(58) Field of Classification Search
CPC ..... H04W 76/14; H04W 84/12; H04W 84/18; H04W 92/18; H04W 72/02; H04W 4/80; H04W 72/20; Y02D 30/70
See application file for complete search history.

(56) References Cited

U.S. PATENT DOCUMENTS

| | | | |
|---|---|---|---|
| 9,048,984 B2 | 6/2015 | Yao et al. | |
| 9,913,253 B2 | 3/2018 | Hareuveni et al. | |
| 10,298,673 B2 | 5/2019 | Hegde et al. | |
| (Continued) | | | |

FOREIGN PATENT DOCUMENTS

| | | |
|---|---|---|
| CN | 101502156 A | 8/2009 |
| CN | 103582053 A | 2/2014 |
| | (Continued) | |

OTHER PUBLICATIONS

IEEE 100 The Authoritative Dictionary of IEEE Standards Terms, Published 2000, pp. 767-768 (Year: 2000).*

*Primary Examiner* — Andrew W Chriss
(74) *Attorney, Agent, or Firm* — Slater Matsil, LLP

(57) ABSTRACT

This application provides a Wi-Fi P2P connection method, an electronic device, a program product, and a readable storage medium. A first device and a second device access a network by using different channels in a same band. The first device determines a device with a weaker switching capability by using Wi-Fi module intra-band inter-channel switching capability values of the first device and the second device, and establishes a P2P connection by using a STA channel through which the device with the weaker switching capability accesses the network.

20 Claims, 9 Drawing Sheets

(56) References Cited

U.S. PATENT DOCUMENTS

| | | | |
|---|---|---|---|
| 10,602,514 | B2 | 3/2020 | Kim et al. |
| 11,438,944 | B2 | 9/2022 | Mullati et al. |
| 11,728,831 | B2 * | 8/2023 | Wheelock .......... H04B 7/15507 |
| | | | 370/315 |
| 2012/0166671 | A1 | 6/2012 | Qi et al. |
| 2015/0245285 | A1 * | 8/2015 | Kwon ................... H04W 76/19 |
| | | | 370/254 |
| 2016/0037504 | A1 * | 2/2016 | Tamura ................ H04W 76/14 |
| | | | 370/336 |
| 2016/0374053 | A1 * | 12/2016 | Hareuveni ........... H04W 72/02 |
| 2017/0290029 | A1 | 10/2017 | Park et al. |
| 2019/0357214 | A1 * | 11/2019 | Kurian ................. H04W 16/04 |
| 2020/0120453 | A1 | 4/2020 | Kim et al. |
| 2023/0069398 | A1 | 3/2023 | Yi et al. |
| 2023/0269707 | A1 | 8/2023 | Zhu et al. |
| 2023/0370920 | A1 * | 11/2023 | Zhou ....................... H04W 4/08 |

FOREIGN PATENT DOCUMENTS

| | | | | |
|---|---|---|---|---|
| CN | 106063345 | A | 10/2016 | |
| CN | 108605374 | A | 9/2018 | |
| CN | 109565893 | A | 4/2019 | |
| CN | 111641979 | A | 9/2020 | |
| CN | 112702803 | A * | 4/2021 | ........... H04W 76/14 |
| CN | 112929972 | A | 6/2021 | |
| CN | 113645693 | A | 11/2021 | |
| WO | WO-2019009059 | A1 * | 1/2019 | ........... H04W 92/18 |
| WO | 2021118644 | A1 | 6/2021 | |

* cited by examiner

NFC

Mobile phone
screen projection

HONOR Share

1

WI-FI P2P CONNECTION METHOD, ELECTRONIC DEVICE, PROGRAM PRODUCT, AND MEDIUM

CROSS-REFERENCE TO RELATED APPLICATIONS

This application is a national stage of International Application No. PCT/CN2022/116527, filed on Sep. 1, 2022, which claims priority to Chinese Patent Application No. 202111197472.7, filed on Oct. 14, 2021. The disclosures of both of the aforementioned applications are hereby incorporated by reference in their entireties.

TECHNICAL FIELD

This application relates to the field of wireless connection technologies, and in particular, to a Wi-Fi P2P connection method, an electronic device, a computer program product, and a computer-readable storage medium.

BACKGROUND

In a scenario in which a first device and a second device are connected to routers on different channels in a same band, if the first device and the second device need to establish a Wi-Fi P2P connection, a station (station, STA) channel of a group owner (Group Owner, GO) in the first device and the second device is preferably used as a channel of the Wi-Fi P2P connection.

However, if a channel switching capability of the group owner is weak, and the group owner performs intra-band inter-channel switching, Wi-Fi P2P connection performance of the first device and the second device is not optimal, and a problem such as a low file transmission rate, operation freezing, a severe video frame loss, or a high delay may occur.

SUMMARY

This application provides a Wi-Fi P2P connection method, an electronic device, a computer program product, and a computer-readable storage medium, to ensure good connection performance of a Wi-Fi P2P connection established between a first device and a second device.

To achieve the foregoing objective, this application provides the following technical solutions.

According to a first aspect, this application provides a Wi-Fi P2P connection method, applied to a first device. The first device and a second device access a network by using different channels in a same band, and the Wi-Fi P2P connection method includes: The first device obtains a Wi-Fi module intra-band inter-channel switching capability value of the first device, and receives capability information of the second device and a station STA channel through which the second device accesses the network that are sent by the second device, where the capability information of the second device includes at least a Wi-Fi module intra-band inter-channel switching capability value of the second device; the first device determines a device with a weaker switching capability in the first device and the second device by using the Wi-Fi module intra-band inter-channel switching capability value of the first device and the Wi-Fi module intra-band inter-channel switching capability value of the second device; and the first device establishes a P2P connection between the first device and the second device by using a STA channel through which the device with the weaker switching capability accesses the network.

It can be learned from the foregoing content that the first device and the second device use the STA channel of the device with the weaker switching capability in the first device and the second device as a channel for establishing the P2P connection, so that when running a Wi-Fi STA mode and a Wi-Fi P2P mode, the device with the weaker switching capability does not perform channel switching, but a device with a stronger switching capability performs switching between a STA channel and a P2P channel. This ensures that Wi-Fi P2P connection performance of the first device and the second device is optimal, and avoids a problem such as a low file transmission rate, operation freezing, a severe video frame loss, or a high delay.

In a possible implementation, the Wi-Fi module intra-band inter-channel switching capability value of the first device includes three values: P2P channel working duration, STA channel working duration, and switching-consumed time of the first device; and the Wi-Fi module intra-band inter-channel switching capability value of the second device includes three values: P2P channel working duration, STA channel working duration, and switching-consumed time of the second device.

In a possible implementation, the Wi-Fi module intra-band inter-channel switching capability value of the first device includes a first value, and the first value is used to represent a Wi-Fi module intra-band inter-channel switching capability of the first device; and the Wi-Fi module intra-band inter-channel switching capability value of the second device includes a second value, and the second value is used to represent a Wi-Fi module intra-band inter-channel switching capability of the second device.

In a possible implementation, that the first device determines a device with a weaker switching capability in the first device and the second device by using the Wi-Fi module intra-band inter-channel switching capability value of the first device and the Wi-Fi module intra-band inter-channel switching capability value of the second device includes: The first device separately compares the P2P channel working duration of the first device with the P2P channel working duration of the second device, the STA channel working duration of the first device with the STA channel working duration of the second device, and the switching-consumed time of the first device with the switching-consumed time of the second device, to obtain three comparison results; and the first device determines the device with the weaker switching capability in the first device and the second device based on the three comparison results.

In a possible implementation, that the first device determines a device with a weaker switching capability in the first device and the second device by using the Wi-Fi module intra-band inter-channel switching capability value of the first device and the Wi-Fi module intra-band inter-channel switching capability value of the second device includes: The first device compares the first value with the second value, and determines a device with a smaller value as the device with the weaker switching capability.

In a possible implementation, that the first device receives capability information of the second device and a station STA channel through which the second device accesses the network that are sent by the second device includes: The first device receives, through a Bluetooth connection channel, the capability information of the second device and the station STA channel through which the second device accesses the network that are sent by the second device.

In a possible implementation, that the first device receives capability information of the second device and a station STA channel through which the second device accesses the network that are sent by the second device includes: The first device receives, through a P2P connection channel, the capability information of the second device and the station STA channel through which the second device accesses the network that are sent by the second device, where the P2P connection channel is obtained by the first device and the second device by establishing a P2P connection through a common channel.

In a possible implementation, before the first device establishes the P2P connection between the first device and the second device by using the STA channel through which the device with the weaker switching capability accesses the network, the method further includes: The first device determines that the STA channel through which the device with the weaker switching capability accesses the network is a channel supported by a device with a stronger switching capability in the first device and the second device.

In a possible implementation, the Wi-Fi P2P connection method provided in this aspect further includes: If the first device determines that the STA channel through which the device with the weaker switching capability accesses the network is not a channel supported by the device with the stronger switching capability in the first device and the second device, the first device establishes a P2P connection between the first device and the second device by using a STA channel through which the device with the stronger switching capability in the first device and the second device accesses the network.

In this possible implementation, the first device and the second device do not both support the STA channel through which the device with the weaker switching capability accesses the network. The first device and the second device establish a P2P connection between the first device and the second device by using the STA channel through which the device with the stronger switching capability in the first device and the second device accesses the network. It can be further ensured that when running a Wi-Fi STA mode and a Wi-Fi P2P mode, the device with the stronger switching capability does not perform channel switching.

In a possible implementation, before the first device establishes the P2P connection between the first device and the second device by using the STA channel through which the device with the stronger switching capability in the first device and the second device accesses the network, the method further includes: The first device determines that the STA channel through which the device with the stronger switching capability in the first device and the second device accesses the network is a channel supported by the device with the weaker switching capability in the first device and the second device.

In a possible implementation, the Wi-Fi P2P connection method provided in this aspect further includes: If the first device determines that the STA channel through which the device with the stronger switching capability in the first device and the second device accesses the network is not a channel supported by the device with the weaker switching capability in the first device and the second device, the first device establishes a P2P connection between the first device and the second device by using a channel supported by both the first device and the second device.

In a possible implementation, after the first device establishes the P2P connection between the first device and the second device by using the STA channel through which the device with the weaker switching capability accesses the network, the method further includes: If the first device determines that the P2P connection between the first device and the second device is not successfully established, the first device establishes a P2P connection between the first device and the second device by using a STA channel of a device with a stronger switching capability in the first device and the second device.

In this possible implementation, the first device determines that the P2P connection between the first device and the second device is not successfully established. The first device and the second device establish a P2P connection between the first device and the second device by using the STA channel through which the device with the stronger switching capability in the first device and the second device accesses the network. It can be further ensured that when running a Wi-Fi STA mode and a Wi-Fi P2P mode, the device with the stronger switching capability does not perform channel switching.

In a possible implementation, after the first device establishes the P2P connection between the first device and the second device by using the STA channel of the device with the stronger switching capability in the first device and the second device, the method further includes: If the first device determines that the P2P connection between the first device and the second device is not successfully established, the first device establishes a P2P connection between the first device and the second device by using a channel supported by both the first device and the second device.

In a possible implementation, a method for calculating the Wi-Fi module intra-band inter-channel switching capability value of the first device includes: parsing a sniffer log of a P2P test channel of the first device to obtain working duration of the first device on the P2P test channel; parsing a sniffer log of a STA test channel of the first device to obtain working duration of the first device on the STA test channel; and parsing the sniffer log of the P2P test channel of the first device and the sniffer log of the STA test channel of the first device to determine a time interval in which the first device sends no packet on both the STA test channel and the P2P test channel, and using the time interval as the switching-consumed time of the first device.

In a possible implementation, after the working duration of the first device on the P2P test channel and the working duration of the first device on the STA test channel are obtained through calculation, the method may further include: obtaining the Wi-Fi module intra-band inter-channel switching capability value of the first device through calculation by using the working duration on the P2P test channel, the working duration on the STA test channel, and the switching-consumed time that are of the first device.

In a possible implementation, a method for calculating the Wi-Fi module intra-band inter-channel switching capability value of the second device includes: parsing a sniffer log of a P2P test channel of the second device to obtain working duration of the second device on the P2P test channel; parsing a sniffer log of a STA test channel of the second device to obtain working duration of the second device on the STA test channel; and parsing the sniffer log of the P2P test channel of the second device and the sniffer log of the STA test channel of the second device to determine a time interval in which the second device sends no packet on both the STA test channel and the P2P test channel, and using the time interval as the switching-consumed time of the second device.

In a possible implementation, after the working duration of the second device on the P2P test channel and the working duration of the second device on the STA test channel are obtained through calculation, the method may further include: obtaining the Wi-Fi module intra-band inter-channel switching capability value of the second device through calculation by using the working duration on the P2P test channel, the working duration on the STA test channel, and the switching-consumed time that are of the second device.

According to a second aspect, this application provides an electronic device. The electronic device includes a first device, and the electronic device includes one or more processors, a memory, and a wireless communications module. The memory and the wireless communications module are coupled to the one or more processors. The memory is configured to store computer program code. The computer program code includes computer instructions. When the one or more processors execute the computer instructions, the electronic device performs the Wi-Fi P2P connection method provided in any one of the first aspect or the possible implementations of the first aspect.

According to a third aspect, this application provides a computer storage medium, configured to store a computer program. When being executed, the computer program is specifically used to implement the Wi-Fi P2P connection method provided in any one of the first aspect or the possible implementations of the first aspect.

According to a fourth aspect, this application provides a computer program product. When the computer program product runs on a computer, the computer is enabled to perform the Wi-Fi P2P connection method provided in any one of the first aspect or the possible implementations of the first aspect.

DETAILED DESCRIPTION OF ILLUSTRATIVE EMBODIMENTS

Figure 1:
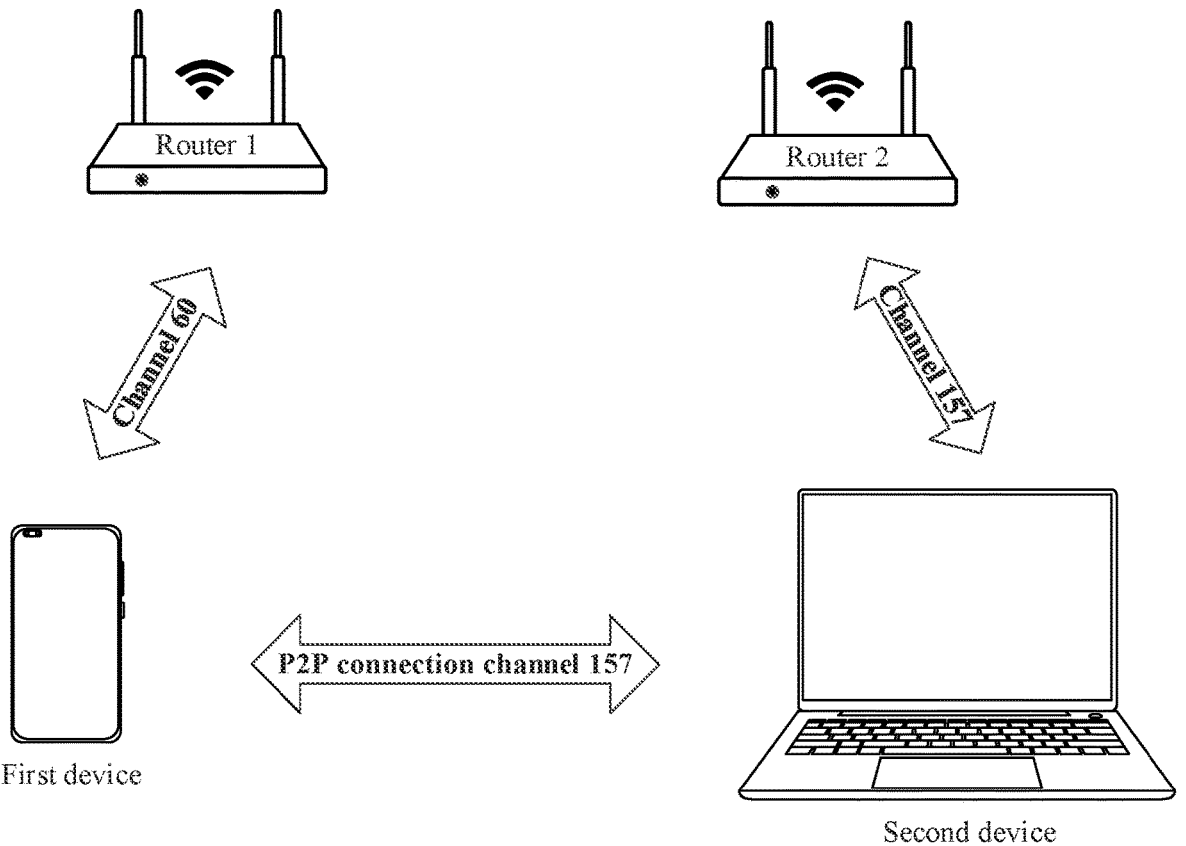
FIG. 1 is a diagram of an application scenario in which a first device and a second device establish a connection according to this application.

The following clearly and completely describes the technical solutions in embodiments of this application with reference to the accompanying drawings in embodiments of this application. The terms used in the following embodiments are merely used for describing specific embodiments, and are not intended to limit this application. The singular forms "one", "a", "the", "the foregoing", "this", and "the one" used in this specification and the appended claims of this application are also intended to include forms such as "one or more", unless otherwise clearly specified in the context. It should be further understood that in the embodiments of this application, "one or more" means one, two, or more than two; and the term "and/or" describes an association relationship between associated objects and represents that three relationships may exist. For example, A and/or B may represent that only A exists, both A and B exist, and only B exists, where A and B may be singular or plural. The character "/" generally indicates an "or" relationship between associated objects.

Reference to "an embodiment", "some embodiments", or the like described in this specification means that specific features, structures, or characteristics described with reference to the embodiment are included in one or more embodiments of this application. Therefore, the phrases "in an embodiment", "in some embodiments", "in other embodiments", "in some other embodiments", and the like in different places in this specification are not necessarily all refer to the same embodiment, but mean "one or more but not all embodiments", unless otherwise specifically emphasized. The terms "include", "contain", "have", and variations thereof all mean "including but not limited to", unless otherwise specifically emphasized.

"A plurality of" in embodiments of this application means two or more. It should be noted that in the description of embodiments of this application, words such as "first" and "second" are merely used for distinguishing, and cannot be understood as an indication or implication of relative importance or an indication or implication of a sequence.

To describe the technical solutions of this application more clearly, the following explains related concepts in this application.

Band: In the communications field, a band refers to a frequency range of an electromagnetic wave. Currently, bands commonly used in Wi-Fi include 2.4G, 5G, 6G, and the like.

Channel: refers to a channel through which a signal is transmitted in a communications system, and includes a transmission medium through which a signal is transmitted from a transmit end to a receive end. Each band commonly used in Wi-Fi is divided into a plurality of channels. For example, according to the IEEE 802.11 protocol, a 2.4 GHz Wi-Fi band is divided into 13 overlapping channels, and a width of each channel is 22 MHz (a bandwidth of each channel in the IEEE 802.11g standard and the IEEE 802.11n standard is 20 MHz, and a bandwidth of each channel in the IEEE 802.10B standard is 22 MHz). A 5 GHz Wi-Fi band is divided into 201 channels.

Wi-Fi P2P is a Wi-Fi peer-to-peer (peer-to-peer, P2P) standard proposed by the wireless fidelity (wireless fidelity, Wi-Fi) alliance (alliance). A Wi-Fi P2P connection is usually created based on a requirement when a user initiates a P2P service.

Wi-Fi STA mode: refers to a mode in which an electronic device connects to a wireless access point (Access Point, AP) to access the Internet.

Wi-Fi P2P mode: refers to a mode in which electronic devices establish a direct channel by using a Wi-Fi P2P connection.

Group owner (Group Owner, GO): functions as a wireless access point (Access Point, AP) in a Wi-Fi P2P mode.

Group client (Group Client, GC): Connection between a GC and a GO in a Wi-Fi P2P mode is similar to connection between a station device and a wireless access point in a Wi-Fi STA mode.

Intra-band inter-channel: means that an electronic device runs a Wi-Fi STA mode and a Wi-Fi P2P mode on different channels in a same band. The electronic device needs to perform time division switching between an operating channel in the Wi-Fi STA mode (STA channel for short) and an operating channel in the Wi-Fi P2P mode (P2P channel for short). For example, 100 ms/100 ms time division and switching-consumed time 20 ms mean that an electronic device switches to a P2P channel after working on a STA channel for 100 ms, a switching process consumes 20 ms, and the electronic device switches to the STA channel again after working on the P2P channel for boo ms.

In an application scenario shown in FIG. 1, a first device (such as a mobile phone) and a second device (such as a PC) are connected to routers on different channels in a same band. Specifically, the first device is connected to a router 1 on a channel 60 in a 5G band, and the second device is connected to a router 2 on a channel 157 in the 5G band. When the first device and the second device establish a Wi-Fi P2P connection, a station (station, STA) channel of a group owner (Group Owner, GO) in the first device and the second device is preferably used as a channel of the Wi-Fi P2P connection. In the application scenario shown in FIG. 1, the second device serves as the GO, and the first device and the second device establish a P2P connection based on the channel 157 in the 5G band.

Based on this, a channel through which the second device is connected to the router 2 is the same as a channel for establishing the Wi-Fi P2P connection with the first device, and the second device does not need to perform channel switching. A channel through which the first device is connected to the router 1 is different from a channel for establishing the Wi-Fi P2P connection with the second device, and the first device needs to perform time division switching between two channels.

If a channel switching capability of the first device is weaker than a channel switching capability of the second device, and the first device performs intra-band inter-channel switching, Wi-Fi P2P connection performance of the first device and the second device is not optimal, and a problem such as a low file transmission rate, operation freezing, a severe video frame loss, or a high delay may occur.

Based on the foregoing problem, embodiments of this application provide a Wi-Fi P2P connection method. The Wi-Fi P2P connection method provided in embodiments of this application is applicable to an electronic device such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a smartwatch.

Figure 2A:
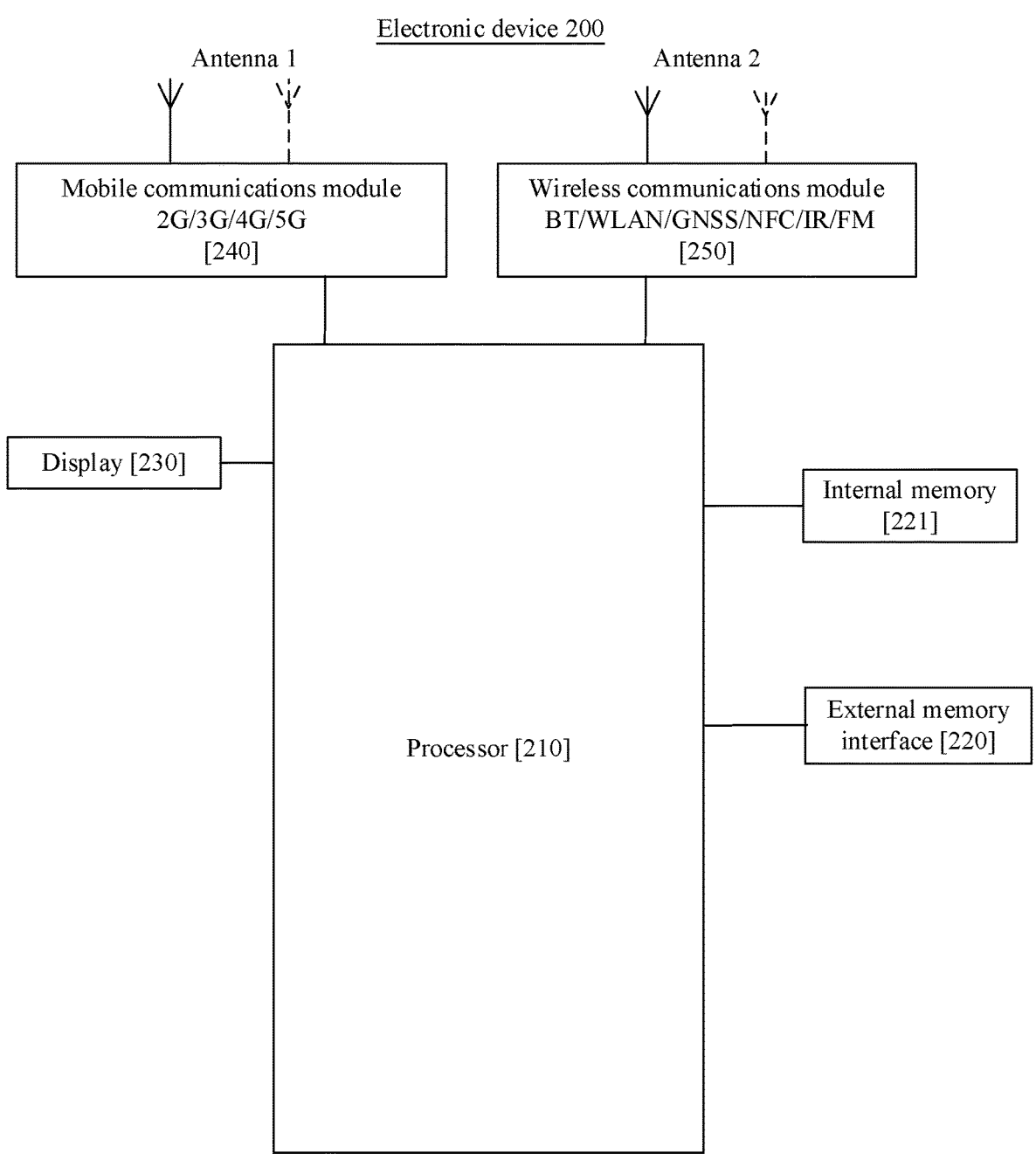
FIG. 2A is a schematic diagram of a structure of an electronic device according to this application.

FIG. 2A shows an example of composition of an electronic device according to an embodiment of this application. A mobile phone is used as an example. The electronic device 200 may include a processor 210, an external memory interface 220, an internal memory 221, a display 230, an antenna 1, an antenna 2, a mobile communications module 240, a wireless communications module 250, and the like.

It may be understood that the structure illustrated in this embodiment does not constitute a specific limitation on the electronic device. In some other embodiments, the electronic device may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on instruction operation code and a time sequence signal, to complete control of instruction fetching and instruction execution.

The video codec is configured to compress or decompress a digital video. The electronic device can support one or more video codecs. In this way, the electronic device may play or record videos in a plurality of coding formats, for example, moving picture experts group (moving picture experts group, MPEG)-1, MPEG-2, MPEG-3, and MPEG-2.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement applications such as intelligent cognition of the electronic device, for example, image recognition, facial recognition, voice recognition, and text understanding.

A memory may further be disposed in the processor 210, to store instructions and data. In some embodiments, the memory in the processor 210 is a cache. The memory may store instructions or data just used or cyclically used by the processor 210. If the processor 210 needs to use the instructions or data again, the instructions or data may be directly invoked from the memory. This avoids repeated access, and reduces waiting time of the processor 210, so that system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The GPIO interface may be configured by using software. The GPIO interface may be configured as a control signal, or may be configured as a data signal. In some embodiments, the GPIO interface may be configured to connect the processor 210 to the display 230, a camera 220, the wireless communications module 260, and the like. The GPIO interface may alternatively be configured as the I2C interface, the I2S interface, the UART interface, the MIPI interface, or the like.

It may be understood that the interface connection relationship between the modules shown in this embodiment is merely an example, and does not constitute a limitation on the structure of the electronic device 200. In some other embodiments of this application, the electronic device 200 may alternatively use an interface connection manner different from that in the foregoing embodiment, or a combination of a plurality of interface connection manners.

The external memory interface 220 may be configured to connect to an external memory card, such as a micro SD card, to extend a storage capability of the electronic device. The external memory card communicates with the processor 210 through the external memory interface 220, to implement a data storage function. For example, files such as music or videos are stored in the external memory card.

The internal memory 221 may be configured to store computer executable program code, where the executable program code includes instructions. The processor 210 perform various function applications and data processing of the electronic device 200 by running the instructions stored in the internal memory 221. The internal memory 221 may include a program storage area and a data storage area. The program storage area may store an operating system, an application program required by at least one function (for example, a sound play function or an image play function), and the like. The data storage area may store data (such as audio data or a phone book) created in a use process of the electronic device. In addition, the internal memory 221 may include a high-speed random access memory, and may further include a non-volatile memory, such as at least one magnetic disk storage component, a flash memory component, and a universal flash storage (universal flash storage, UFS). The processor 210 performs various function applications and data processing of the electronic device by running the instructions stored in the internal memory 221 and/or instructions stored in the memory disposed in the processor.

The electronic device implements a display function by using the GPU, the display 230, the application processor, and the like. The GPU is a microprocessor for image processing, and is connected to the display 230 and the application processor. The GPU is configured to perform mathematical and geometric calculation and render graphics. The processor 210 may include one or more GPUs that execute program instructions to generate or change display information.

The display 230 is configured to display an image, a video, and the like. The display 230 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the electronic device may include one or N displays 230, where N is a positive integer greater than 1.

A series of graphical user interfaces (graphical user interface, GUI) may be displayed on the display 230 of the electronic device, and all these GUIs are on a home screen of the electronic device. Generally, a size of the display 230 of the electronic device is fixed, and only a limited quantity of controls can be displayed on the display 230 of the electronic device. A control is a GUI element. The control is a software component included in an application, and controls all data processed by the application and an interaction operation related to the data. A user may interact with the control through direct manipulation (direct manipulation), to read or edit information about the application. Generally, controls may include visual interface elements such as an icon, a button, a menu, a tab, a text box, a dialog box, a status bar, a navigation bar, and a widget. For example, in this embodiment of this application, the display 230 may display a virtual button (one-click orchestration, start orchestration, or scenario orchestration).

The electronic device may implement a photographing function by using the ISP, the camera, the video codec, the GPU, the display 230, the application processor, and the like.

The ISP is configured to process data fed back by the camera 220. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 220.

A wireless communication function of the electronic device may be implemented by using the antenna 1, the antenna 2, the mobile communications module 240, the wireless communications module 250, the modem processor, the baseband processor, and the like.

The antenna 1 and the antenna 2 are configured to transmit and receive electromagnetic wave signals. Each antenna in the electronic device may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 240 may provide a solution for wireless communication, including 2G/3G/4G/5G and the like, that is applied to the electronic device. The mobile communications module 240 may include at least one filter, a switch, a power amplifier, a low noise amplifier (low noise amplifier, LNA), and the like. The mobile communications module 240 may receive an electromagnetic wave by using the antenna 1, perform processing such as filtering and amplification on the received electromagnetic wave, and send a processed electromagnetic wave to the modem processor for demodulation. The mobile communications module 240 may further amplify a signal modulated by the modem processor, and convert the signal into an electromagnetic wave for radiation through the antenna 1. In some embodiments, at least some function modules of the mobile communications module 240 may be disposed in the processor 210. In some embodiments, at least some function modules of the mobile communications module 240 may be disposed in a same component as at least some modules of the processor 210.

The wireless communications module 250 may provide a solution for wireless communication that is applied to the electronic device and that includes a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 250 may be one or more components that integrate at least one communications processing module. The wireless communications module 250 receives an electromagnetic wave through the antenna 2, performs frequency modulation and filtering on an electromagnetic wave signal, and sends a processed signal to the processor 210. The wireless communications module 250 may further receive a to-be-sent signal from the processor 210, perform frequency modulation and amplification on the to-be-sent signal, and convert the to-be-sent signal into an electromagnetic wave for radiation through the antenna 2.

In some embodiments, a Wi-Fi module in the wireless communications module 250 is configured to provide the electronic device 200 with network access following a related Wi-Fi standard protocol, and the electronic device 200 may access a Wi-Fi access point by using the Wi-Fi module, to access the Internet. The Wi-Fi module may alternatively be used as a Wi-Fi wireless access point, and may provide Wi-Fi network access for another device. A Bluetooth module in the wireless communications module 250 is configured to implement short-distance communication between the electronic device 200 and another device.

The Wi-Fi module may be an integrated circuit, a Wi-Fi chip, or the like, and the Bluetooth module may be an integrated circuit, a Bluetooth chip, or the like. The Wi-Fi module and the Bluetooth module may be independent chips or integrated circuits, or may be integrated together. For example, in an embodiment, the Wi-Fi module and the Bluetooth module may be integrated into a same chip. In another embodiment, the Wi-Fi module, the Bluetooth module, and the processor may be integrated into a same chip.

In addition, an operating system runs on the foregoing components, for example, an iOS operating system, an Android operating system, or a Windows operating system. An application may be installed and run on the operating system.

Figure 2B:
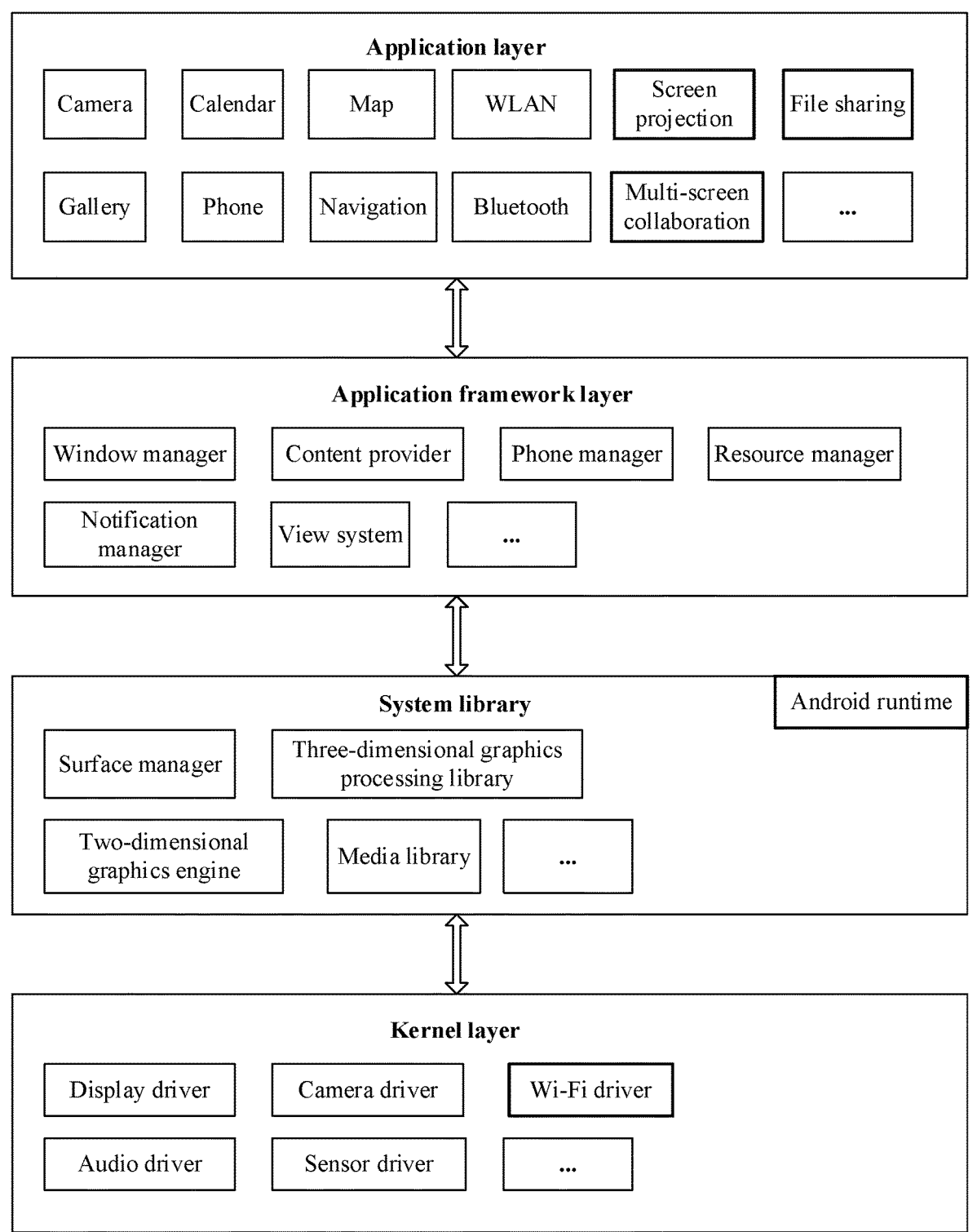
FIG. 2B is a diagram of a software architecture of an electronic device according to this application.

FIG. 2B is a block diagram of a software structure of an electronic device according to an embodiment of this application.

A layered architecture divides software into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 2B, the application packages may include applications such as Camera, Gallery, Calendar, Phone, Map, Navigation, WLAN, Bluetooth, Screen projection, Multi-screen collaboration, and File sharing.

The application framework layer provides an application programming interface (application programming interface, API) and a programming framework for applications at the application layer. The application framework layer includes some predefined functions. As shown in FIG. 2B, the application framework layer may include a window manager, a content provider, a phone manager, a resource manager, a notification manager, a view system, and the like. In some embodiments of this application, the application framework layer may further include an awareness service.

The window manager is configured to manage window programs. The window manager may obtain a display size, determine whether there is a status bar, lock a screen, take a screenshot, and the like.

The content provider is configured to store and obtain data and make the data accessible to the application. The data may include videos, images, audio, calls that are made and received, browsing history and bookmarks, a phone book, and the like.

The phone manager is configured to provide a communication function of the electronic device, for example, call status management (including accepting and declining).

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers.

The view system includes visual controls, such as a text display control and a picture display control. The view system may be configured to construct an application. A display interface may include one or more views. For example, a display interface including an SMS notification icon may include a text display view and a picture display view.

The Android runtime includes a core library and a virtual machine. The Android runtime is responsible for scheduling and management of the Android system. In some embodiments of this application, the cold start of an application runs in the Android runtime, and the Android runtime obtains an optimized file status parameter of the application. Then, the Android runtime can determine, based on the optimized file status parameter, whether an optimized file is out of date due to system upgrade, and return a determining result to an application control module.

In some embodiments, in the Android runtime, an Android framework (framework) is responsible for providing an interface for an application, to query and use a Wi-Fi module capability. The application invokes the interface of the framework to query a channel switching capability. The framework invokes an interface of a Wi-Fi driver to query a channel switching capability.

The core library includes two parts: a function that needs to be invoked by using the Java language, and a core library of Android.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-2, H.262, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, a Wi-Fi driver, and the like. The Wi-Fi driver is configured to drive a Wi-Fi module to establish a Wi-Fi connection.

It should be noted that although embodiments of this application are described by using the Android system as an example, a basic principle thereof is also applicable to an electronic device based on an operating system such as Harmony OS, iOS, or Windows.

First, it should be noted that an electronic device is preconfigured with a Wi-Fi module intra-band inter-channel switching capability value, which is used to represent a channel switching capability of the electronic device. In some embodiments, the Wi-Fi module intra-band inter-channel switching capability value is a value, for example, a value in a centesimal system, a value in a ten-point system, or a value in a one-point system. A larger value indicates a stronger channel switching capability of the electronic device. In an example, the Wi-Fi module intra-band inter-channel switching capability value is a value in a centesimal system. 100 is the full score, and indicates that the electronic device has a strongest Wi-Fi module intra-band inter-channel switching capability. 0 is the lowest score, and indicates that the electronic device has a weakest Wi-Fi module intra-band inter-channel switching capability.

Table 1 below lists an example of several Wi-Fi module intra-band inter-channel switching capability values. In Table 1, shorter working duration of the electronic device on a P2P channel and a STA channel and shorter switching-consumed time of switching between the P2P channel and the STA channel indicate a stronger intra-band inter-channel switching capability of the electronic device and a larger intra-band inter-channel switching capability value.

TABLE 1

| P2P channel working duration | STA channel working duration | Switching-consumed time | Intra-band inter-channel switching capability value |
| --- | --- | --- | --- |
| 150 ms | 150 ms | 20 ms | 40 |
| 100 ms | 100 ms | 15 ms | 50 |
| 60 ms | 60 ms | 12 ms | 60 |
| 30 ms | 30 ms | 7 ms | 70 |
| 15 ms | 15 ms | 5 ms | 80 |
| 10 ms | 10 ms | 3 ms | 90 |

It should be further noted that, in Table 1, 10 is an example of an interval between intra-band inter-channel switching capability values, and this does not constitute a limitation on an interval between intra-band inter-channel switching capability values of different electronic devices.

In some other embodiments, the Wi-Fi module intra-band inter-channel switching capability value includes three values: P2P channel working duration, STA channel working duration, and switching-consumed time that are of the electronic device.

The Wi-Fi module intra-band inter-channel switching capability value may be stored in permanent storage space of the electronic device. In some embodiments, the Wi-Fi module intra-band inter-channel switching capability value is stored in the Settings·Global database of the electronic device. In some other embodiments, the Wi-Fi module intra-band inter-channel switching capability value is stored in a read-only prop item newly added to the Wi-Fi module.

Figure 3:
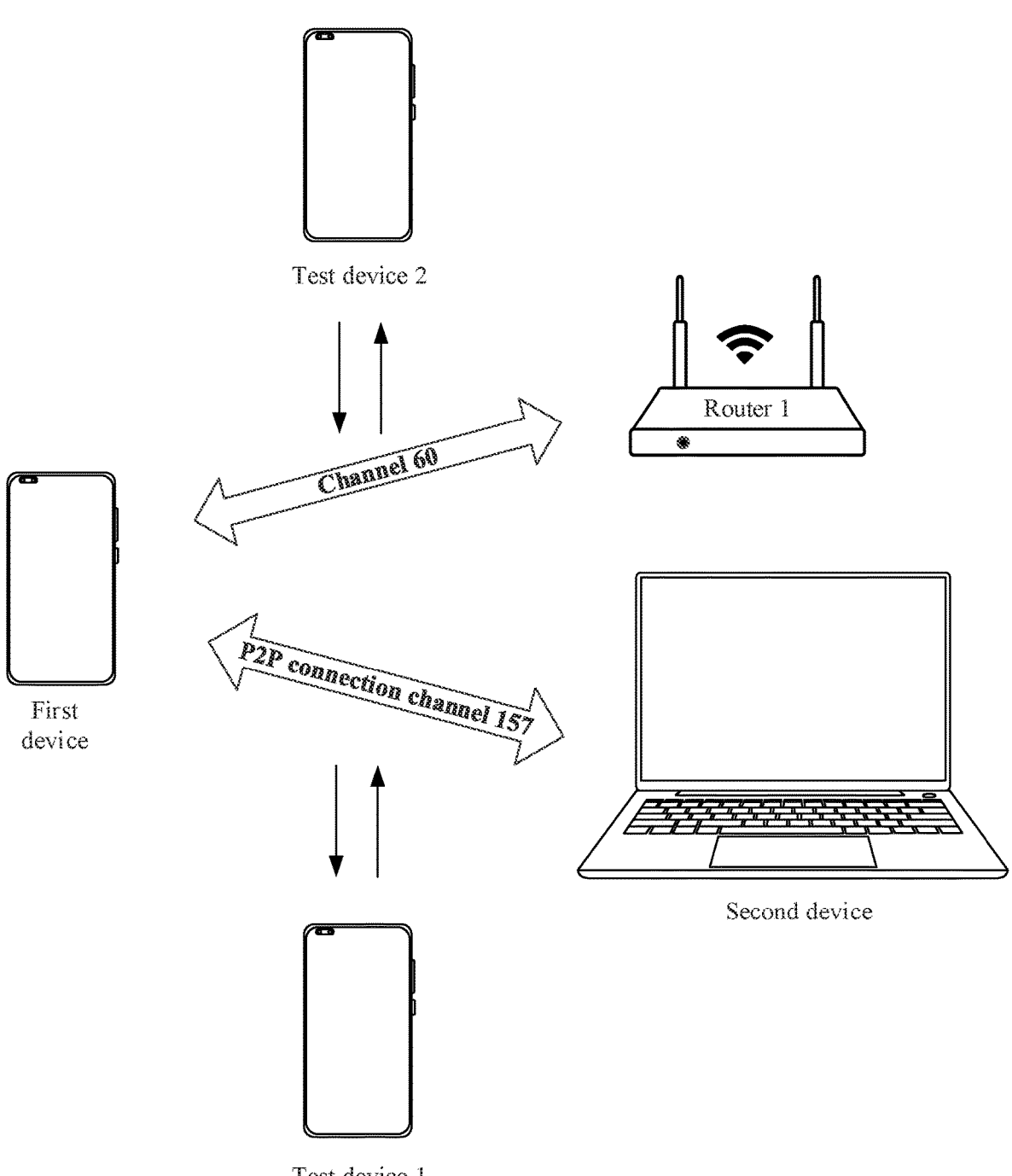
FIG. 3 is a diagram of an application scenario of a Wi-Fi module intra-band inter-channel switching capability value of a test electronic device according to this application.

The Wi-Fi module intra-band inter-channel switching capability value may be determined based on a test result of the Wi-Fi module used by the electronic device. Specifically, for an electronic device, an intra-band inter-channel scenario is constructed, that is, a network access connection and a P2P connection of the electronic device use different channels in a same band. Referring to FIG. 3, a first device is connected to a router 1 by using a channel 60 in a 5G band, and is connected to a second device by using a channel 157 in the 5G band.

A test device 1 captures a sniffer log (sniffer log) on the channel 157 in the 5G band, and a test device 2 captures a sniffer log (sniffer log) on the channel 60 in the 5G band. Packet sending time of the first device on the two channels is calculated by using the sniffer logs captured by the test device 1 and the test device 2, to obtain working duration on each channel, and a time interval in which the first device sends no packet on both channels is analyzed, and the time interval is used as switching-consumed time.

It should be further noted that, if a value is used to represent the Wi-Fi module intra-band inter-channel switching capability value, after P2P channel working duration, STA channel working duration, and switching-consumed time of the first device are calculated, a Wi-Fi module intra-band inter-channel switching capability value is calculated based on values of the P2P channel working duration, the STA channel working duration, and the switching-consumed time. Generally, larger values of the P2P channel working duration, the STA channel working duration, and the switching-consumed time indicate a smaller Wi-Fi module intra-band inter-channel switching capability value.

In some embodiments, if a value in a centesimal system is used as the intra-band inter-channel switching capability value, the following formula may be used for calculation:

intra-band inter-channel switching capability value=
(10/P2P channel working duration)×30+(10/STA
channel working duration)×30+(2/switching-
consumed time)×40

Embodiment 1

In this embodiment, a first device and a second device are connected to routers on different channels in a same band, and the first device and the second device need to establish a P2P connection. Hardware architectures and software architectures of the first device and the second device may be shown in FIG. 2A and FIG. 2B. Common application scenarios in which the first device and the second device establish a Wi-Fi P2P connection include multi-screen collaboration, mirroring projection, and file sharing. Multi-screen collaboration means that after initiating multi-screen collaboration, a device scans, through BLE/Wi-Fi P2P, a nearby device available for collaboration, and establishes a P2P connection, to implement dual-system same-screen display. Mirroring projection means that a device initiates screen projection, and after finding a large-screen device through scanning, establishes a P2P connection to share a screen. File sharing means that after selecting a file, a device may choose to share the file with a peer device through P2P.

Figure 4A:
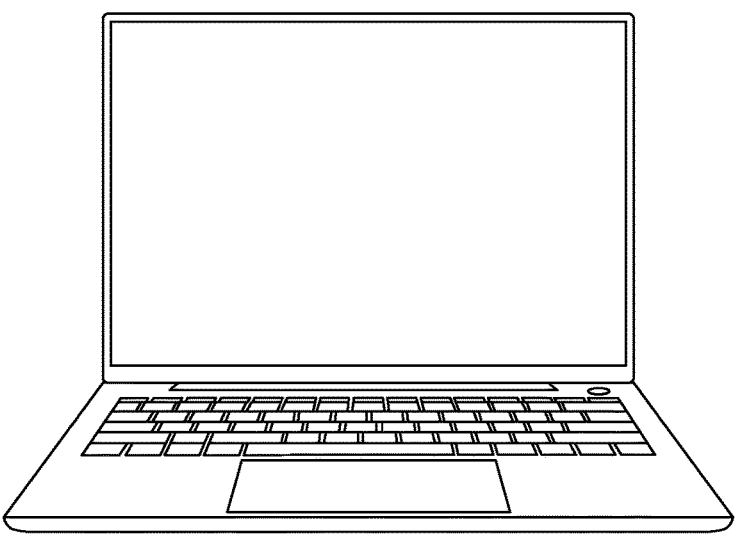
FIG. 4A is a presentation diagram of an application scenario of connecting a mobile phone and a PC according to an embodiment of this application.
Figure 4A:
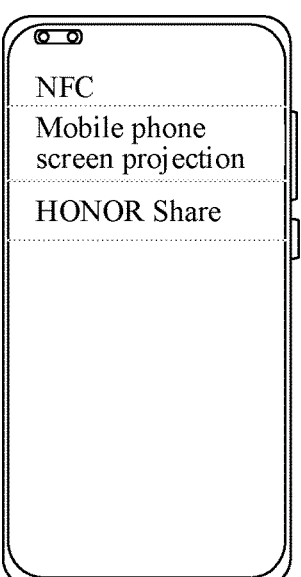

Referring to FIG. 4A, in this embodiment, an example in which the first device is a mobile phone and the second device is a PC is used for description.

Figure 4B:
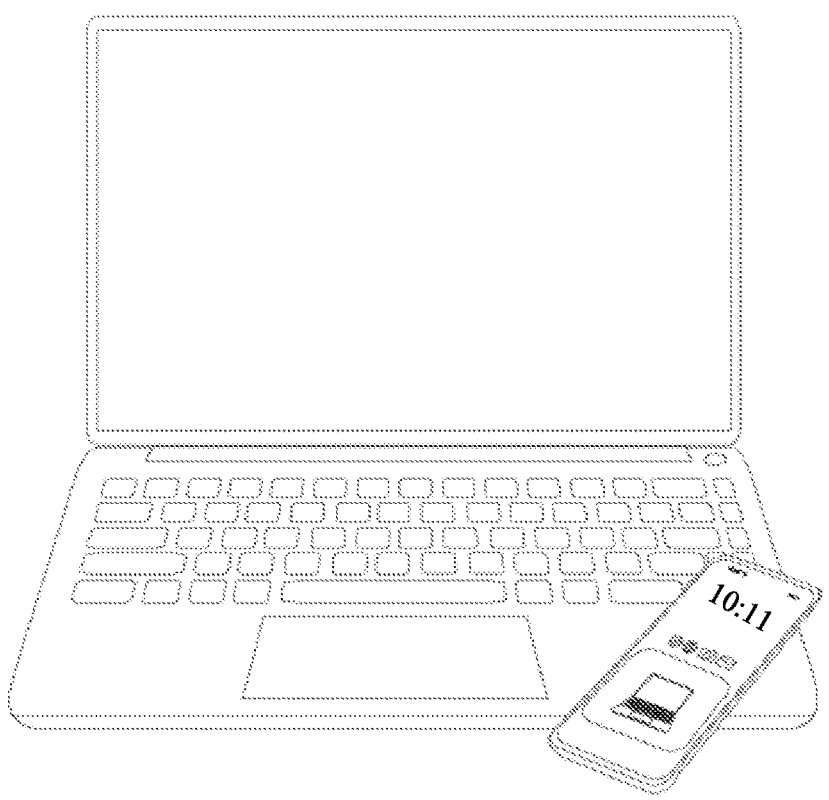
FIG. 4B is a presentation diagram of multi-screen collaboration according to an embodiment of this application.

In a multi-screen collaboration application scenario, referring to FIG. 4B, after an NFC function is enabled on the mobile phone, a specific label of the PC is touched by using an NFC area on the back of the mobile phone, a display of the mobile phone presents the to-be-connected PC, and after a user manually determines to perform connection, the mobile phone and the PC establish a P2P connection. Certainly, a manner of triggering multi-screen collaboration between the mobile phone and the PC is not limited to the manner shown in FIG. 4B. Alternatively, the mobile phone may be placed on a keyboard of the PC, and triggering is performed through Bluetooth discovery or triggering is performed by clicking a multi-screen collaboration button on the PC.

Figure 4C:
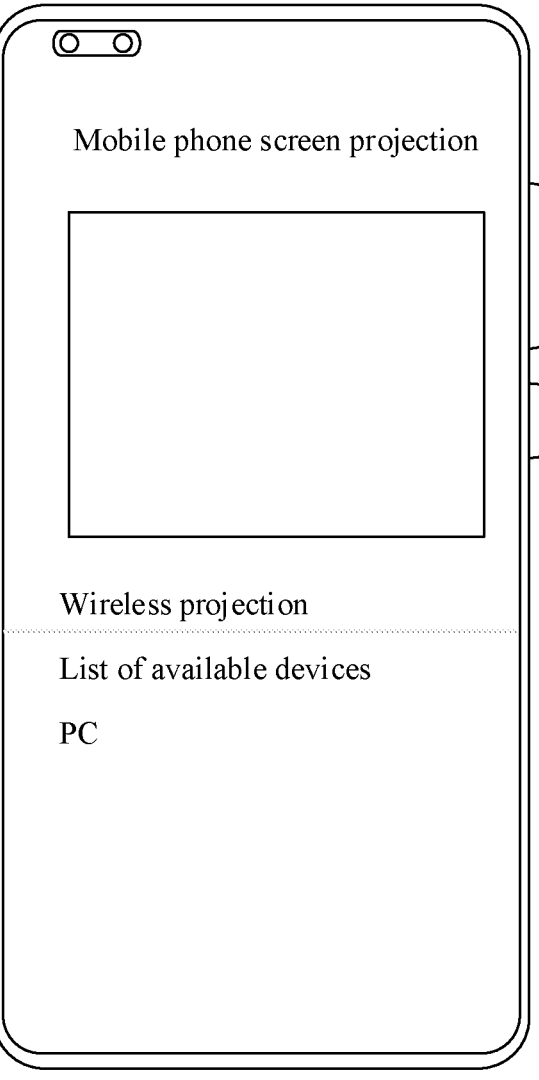
FIG. 4C is a diagram of a mobile phone interface of mobile phone screen projection according to an embodiment of this application.

In a mirroring projection application scenario, referring to FIG. 4C, after mobile phone screen projection of the mobile phone is enabled, the mobile phone may search for a screen projection device, and present a found screen projection device in a list of available devices, for example, the PC shown in FIG. 4C. After a user taps "PC", the mobile phone is triggered to establish a P2P connection with the PC.

Figure 4D:
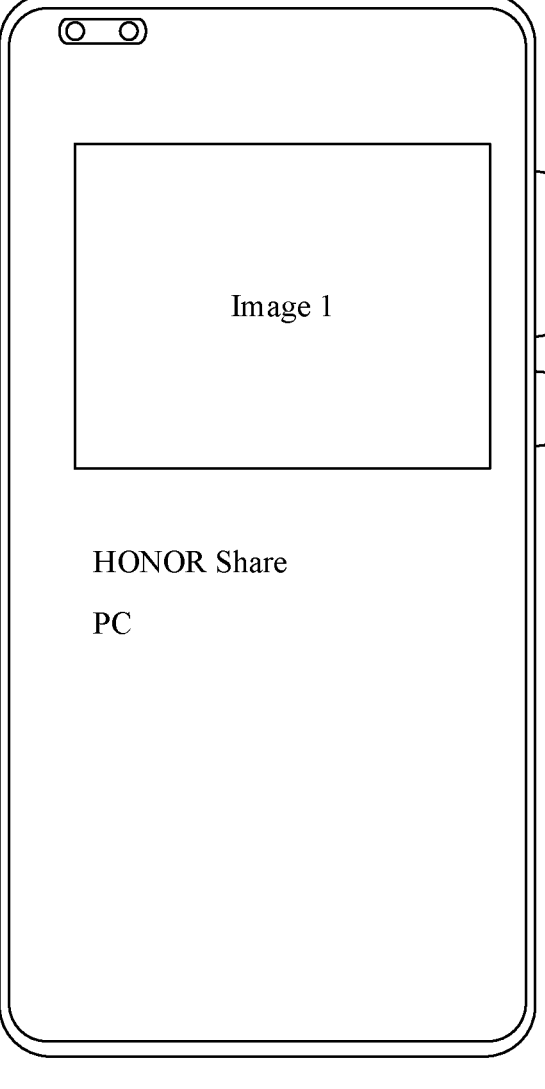
FIG. 4-D is a diagram of a mobile phone interface of file sharing according to an embodiment of this application.
FIG. 4E is a sequence diagram of a Wi-Fi P2P connection method according to Embodiment 1 of this application.

In a file sharing application scenario, referring to FIG. 4D, after HONOR Share of the mobile phone is enabled, for a to-be-shared file such as an image 1 shown in the figure, a user taps a peer device "PC" found through "HONOR Share", and the mobile phone and the PC establish a P2P connection, to send the image 1 to the PC through HONOR Share.

It may be understood that, in the foregoing three application scenarios, an initial phase of establishing a P2P connection between the mobile phone and the PC is device discovery. One of the mobile phone and the PC may send a request frame, and the other end returns a response frame after receiving the request frame, to complete device discovery.

In the multi-screen collaboration application scenario, after the NFC function of the mobile phone is enabled, and the NFC area on the back of the mobile phone touches the specific label of the PC, the mobile phone sends a request frame, and the PC receives the request frame sent by the mobile phone and returns a response frame to the mobile phone. In this way, mutual discovery between the mobile phone and the PC is completed. In some embodiments, the request frame and the response frame each may carry indication information, which is used to indicate that a P2P connection is to be established to complete multi-screen collaboration.

In the mirroring projection application scenario, after mobile phone screen projection of the mobile phone is enabled, the mobile phone sends a request frame, and the PC receives the request frame sent by the mobile phone and returns a response frame to the mobile phone. In this way, mutual discovery between the mobile phone and the PC is completed. In some embodiments, the request frame and the response frame each may carry indication information, which is used to indicate that a P2P connection is to be established to complete mirroring projection.

In the file sharing application scenario, after HONOR Share of the mobile phone is enabled, and the user taps "HONOR Share", the mobile phone sends a request frame, and the PC receives the request frame sent by the mobile phone and returns a response frame to the mobile phone. In this way, mutual discovery between the mobile phone and the PC is completed.

In some embodiments, the request frame and the response frame each may carry indication information, which is used to indicate that a P2P connection is to be established to complete file sharing.

Figure 4E:

Based on the foregoing content, an embodiment of this application provides a Wi-Fi P2P connection method. Referring to FIG. 4E, the method includes the following steps.

S401. A first device obtains a Wi-Fi module intra-band inter-channel switching capability value.

In this embodiment, after the first device is triggered to establish a P2P connection to a second device, the first device first performs step S401 to obtain the Wi-Fi module intra-band inter-channel switching capability value stored in the first device.

In some embodiments, after the first device and the second device complete device discovery, the first device may perform step S401 to obtain the Wi-Fi module intra-band inter-channel switching capability value stored in the first device. The following provides descriptions by using an example in which the first device sends a request frame during device discovery and the second device sends a response frame.

Specifically, the first device sends the request frame and receives the response frame returned by the second device. The first device discovers the second device, and the first device may perform step S401 to obtain the Wi-Fi module intra-band inter-channel switching capability value stored in the first device. As described above, the first device may obtain the Wi-Fi module intra-band inter-channel switching capability value from permanent storage space of the first device, for example, the Settings·Global database of the first device or a read-only prop item newly added to a Wi-Fi module.

It should be noted that a manner in which the first device obtains the Wi-Fi module intra-band inter-channel switching capability value by using the multi-layer software architecture shown in FIG. 2B is as follows:

Referring to FIG. 2B, after a screen projection, multi-screen collaboration, or file sharing application at an application layer of the first device is triggered by a user, an interface of a framework of Android runtime is invoked by the application triggered by the user, to query the Wi-Fi module intra-band inter-channel switching capability value. The framework invokes an interface of a Wi-Fi-driver, to obtain the Wi-Fi module intra-band inter-channel switching capability value. The Wi-Fi driver obtains the Wi-Fi module intra-band inter-channel switching capability value pre-stored in the electronic device, and uploads, by using the framework, the Wi-Fi module intra-band inter-channel switching capability value to the application triggered by the user.

S402. The second device obtains a Wi-Fi module intra-band inter-channel switching capability value.

Similarly, after the second device is triggered to establish a P2P connection to the first device, the second device first performs step S402 to obtain the Wi-Fi module intra-band inter-channel switching capability value stored in the second device.

In some embodiments, after the first device and the second device complete device discovery, the second device may perform step S402 to obtain the Wi-Fi module intra-band inter-channel switching capability value stored in the second device.

Specifically, the second device receives the request frame sent by the first device, the second device discovers the first device, and the second device may perform step S402 to obtain the Wi-Fi module intra-band inter-channel switching capability value response frame of the second device. Certainly, the second device may alternatively perform step S402 after sending the response frame to the first device.

For a manner in which the second device obtains the Wi-Fi module intra-band inter-channel switching capability value by using a multi-layer software architecture, refer to content in the foregoing step S401, and details are not described herein again.

S403. The first device and the second device establish a Bluetooth connection.

In this embodiment, the first device and the second device may establish the Bluetooth connection by using a conventional Bluetooth protocol. A specific implementation process of establishing the Bluetooth connection between the first device and the second device is not described in this embodiment.

It should be further noted that an execution sequence between step S403 and both step S401 and step S402 is not limited. FIG. 4E shows that the first device and the second device first separately perform step S401 and step S402, and then perform step S403. It may be learned that the first device and the second device may alternatively first perform step S403, and then separately perform step S401 and step S402.

S404. The first device sends capability information of the first device and a STA channel through which the first device accesses a network to the second device by using a Bluetooth connection channel, where the capability information of the first device includes the Wi-Fi module intra-band inter-channel switching capability value of the first device.

S405. The second device sends capability information of the second device and a STA channel through which the second device accesses the network to the first device by using the Bluetooth connection channel, where the capability information of the second device includes the Wi-Fi module intra-band inter-channel switching capability value of the second device.

After step S404 and step S405, the first device and the second device exchange the capability information of the first device and the second device and the STA channels through which the first device and the second device access the network, and each of the first device and the second device has its own capability information and STA channel for accessing the network, and the capability information and the STA channel for accessing the network that are of the peer device.

In some embodiments, only one of the first device and the second device may have its own capability information and STA channel for accessing the network, and the capability information and the STA channel for accessing the network that are of the peer device. Based on this, one of step S404 and step S405 may not be performed.

It should be noted that the first device and the second device each have the capability information and the STA channel for accessing the network that are of the peer device. This helps determine, based on the capability information of the first device and the second device, a channel for establishing the P2P connection between the first device and the second device. Therefore, a device that is in the first device and the second device and that determines the channel used for the P2P connection may receive capability information and a STA channel for accessing the network that are sent by a peer device by using the Bluetooth connection channel.

Generally, a GO in the first device and the second device may perform the step of determining the channel used for the P2P connection. Based on this, a GC may send capability information of the GC and a STA channel through which the GC accesses the network to the GO, and the GO may not need to send capability information of the GO and a STA channel through which the GO accesses the network to the GC. The following provides descriptions by using an example in which the first device is the GO.

The first device and the second device may determine the GO and the GC through negotiation or presetting. In addition, when the first device and the second device establish a P2P connection to complete different P2P services, GOs determined by the first device and the second device are different.

In a multi-screen collaboration application scenario, a PC or a PAD is usually used as a GO. In a mirroring projection application scenario, a large-screen device is usually used as a GO. In a file sharing application scenario, a transmit end is usually used as a GO.

S406. The first device determines a device with a weaker switching capability in the first device and the second device by using the Wi-Fi module intra-band inter-channel switching capability value of the first device and the Wi-Fi module intra-band inter-channel switching capability value of the second device, and uses a STA channel of the determined device as a channel for establishing a P2P connection.

According to two representation forms of a Wi-Fi module intra-band inter-channel switching capability value of an electronic device, the first device may select, in two manners, the channel for establishing a P2P connection. Details are as follows:

In a possible implementation, the Wi-Fi module intra-band inter-channel switching capability value of the first device and the Wi-Fi module intra-band inter-channel switching capability value of the second device are values. When performing this step to select the P2P connection channel, the first device compares the Wi-Fi module intra-band inter-channel switching capability value of the first device with the Wi-Fi module intra-band inter-channel switching capability value of the second device, determines a device with a smaller value, and uses a STA channel of the device with the smaller value as the channel for establishing a P2P connection between the first device and the second device.

In another possible implementation, the Wi-Fi module intra-band inter-channel switching capability value of the first device includes P2P channel working duration, STA channel working duration, and switching-consumed time of the first device; and the Wi-Fi module intra-band inter-channel switching capability value of the second device includes P2P channel working duration, STA channel working duration, and switching-consumed time of the second device. The first device correspondingly compares the three values included in the Wi-Fi module intra-band inter-channel switching capability value of the first device with the three values included in the Wi-Fi module intra-band inter-channel switching capability value of the second device.

Specifically, the first device compares the P2P channel working duration of the first device with the P2P channel working duration of the second device, the STA channel working duration of the first device with the STA channel working duration of the second device, and the switching-consumed time of the first device with the switching-consumed time of the second device, to obtain three comparison results.

The first device selects, based on the three comparison results, the STA channel of the device with the weaker switching capability as the channel for establishing a P2P connection between the first device and the second device. It can be learned that three pairs of values of P2P channel working duration, STA channel working duration, and switching-consumed time of two devices are compared. A larger value indicates a weaker switching capability of a device. If one of the two devices has a larger value in the P2P channel working duration, the STA channel working duration, or the switching-consumed time, a switching capability of the device is weaker, and the comparison result indicates that the device wins. Therefore, the first device selects a device that wins by 3:0 or 2:1 in the three comparison results as the device with the weaker switching capability.

It should be noted that the STA channel of the device with the weaker switching capability in the first device and the second device is used as the channel for establishing the P2P connection between the first device and the second device, so that when running a Wi-Fi STA mode and a Wi-Fi P2P mode, the device with the weaker switching capability does not perform channel switching, but a device with a stronger switching capability performs switching between a STA channel and a P2P channel. This ensures that Wi-Fi P2P connection performance of the first device and the second device is optimal, and avoids a problem such as a low file transmission rate, operation freezing, a severe video frame loss, or a high delay.

S407. The first device sends a notification message to the second device, to notify the second device to establish a P2P connection by using the selected channel for establishing a P2P connection.

In some embodiments, the notification message sent by the first device to the second device may carry the channel selected by the first device for establishing a P2P connection.

S408. The first device and the second device establish a P2P connection by using the selected channel for establishing a P2P connection.

The first device and the second device may establish the P2P connection in a conventional P2P connection establishment manner by using the selected channel for establishing a P2P connection. Details are not described herein.

It should be further noted that, before establishing the P2P connection by using the selected channel for establishing a P2P connection, the first device and the second device need to determine that the selected channel for establishing a P2P connection is a channel supported by the first device and the second device.

Based on this, the first device obtains a channel supported by the first device and a channel supported by the second device. In some embodiments, the capability information of the second device that is sent by the second device to the first device may further include the channel supported by the second device. The first device obtains, from the capability information of the second device, the channel supported by the second device.

It should be further noted that the capability information of the first device that is sent by the first device to the second device may also include the channel supported by the first device. The second device may also obtain, from the capability information of the first device, the channel supported by the first device.

The first device performs step S406 to obtain the STA channel of the device with the weaker switching capability in the first device and the second device, compares the STA channel with a channel supported by the device with the stronger switching capability in the first device and the second device, determines whether the STA channel is the channel supported by the device with the stronger switching capability in the first device and the second device, and performs step S407 if determining that the STA channel is the channel supported by the device with the stronger switching capability in the first device and the second device.

If it is determined that the STA channel is not the channel supported by the device with the stronger switching capability in the first device and the second device, whether a STA channel of the device with the stronger switching capability in the first device and the second device is a channel supported by the device with the weaker switching capability in the first device and the second device is determined. If it is determined that the STA channel of the device with the stronger switching capability in the first device and the second device is a channel supported by the device with the weaker switching capability in the first device and the second device, the STA channel of the device with the stronger switching capability in the first device and the second device is used as the channel for establishing a P2P connection between the first device and the second device, and the foregoing step S407 is performed.

If it is determined that the STA channel of the device with the stronger switching capability in the first device and the second device is not a channel supported by the device with the weaker switching capability in the first device and the second device, the first device selects, from the channel supported by the first device and the channel supported by the second device, a channel supported by both the first device and the second device as the channel for establishing a P2P connection, and performs the foregoing step S407.

It should be further noted that, if the first device and the second device find, in a process of establishing a P2P connection by using the channel selected in step S406 for establishing a P2P connection, that the P2P connection establishment fails, it indicates that one of the first device and the second device does not support the channel, and the first device and the second device need to reestablish a P2P connection by using another channel.

In some embodiments, the first device determines whether the first device and the second device successfully establish the P2P connection by using the selected channel for establishing a P2P connection. If the first device determines that the P2P connection fails, the first device uses the STA channel of the device with the stronger switching capability in the first device and the second device as a channel for establishing a P2P connection, and reestablishes a P2P connection.

If the first device and the second device still do not successfully establish a P2P connection by using the STA channel of the device with the stronger switching capability, the first device selects, from the channel supported by the first device and the channel supported by the second device, a channel supported by both the first device and the second device as a channel for establishing a P2P connection.

In some embodiments, in step S404, the capability information of the first device may further include the channel supported by the first device. Similarly, in step S405, the capability information of the second device may further include the channel supported by the second device. The first device finds, through screening from the channel supported by the first device and the channel supported by the second device, a channel supported by both the first device and the second device as a channel for establishing a P2P connection.

It should be further noted that, in some embodiments, the first device may determine, in a manner of sending a request to the second device and receiving a response returned by the second device, whether the P2P connection between the first device and the second device succeeds.

If the first device sends the request to the second device and receives, within specified duration, the response returned by the second device, the first device determines that the first device and the second device successfully establish the P2P connection; on the contrary, the first device determines that the first device and the second device fail to establish the P2P connection.

Embodiment 2

Figure 5:
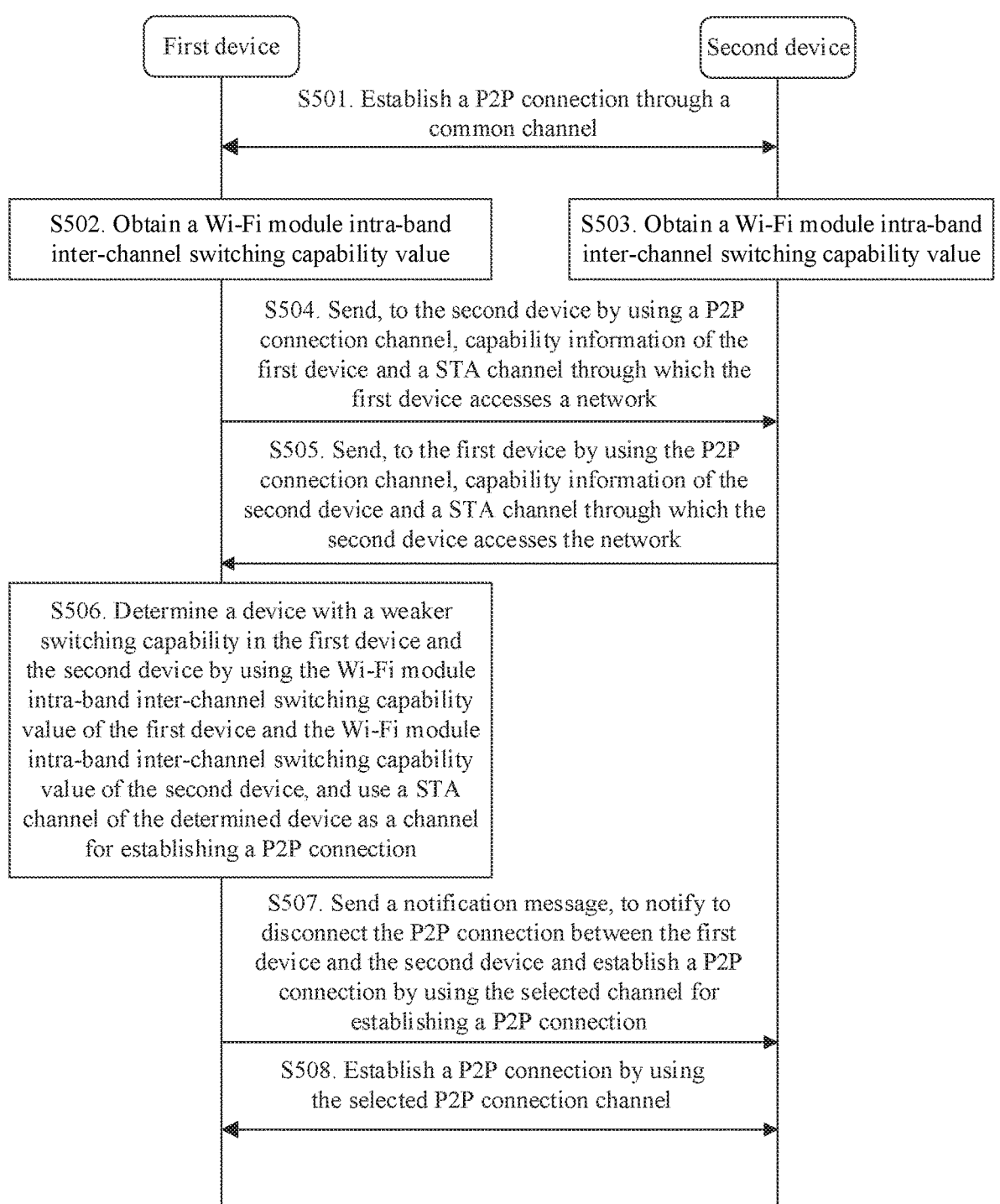
FIG. 5 is a sequence diagram of a Wi-Fi P2P connection method according to Embodiment 2 of this application.

Another embodiment of this application further provides a Wi-Fi P2P connection method. Referring to FIG. 5, the method includes the following steps.

S501. A first device and a second device establish a P2P connection through a common channel.

In some embodiments, the first device and the second device complete device discovery. Step S501 may be performed to establish a P2P connection through the common channel. In this embodiment, an example in which the first device sends a request frame during device discovery and the second device sends a response frame is used for description.

Specifically, the first device sends the request frame, and the second device receives the request frame and returns the response frame to the first device. The first device receives the response frame returned by the second device. The first device and the second device may perform step S501 to establish a P2P connection through the common channel.

It should be noted that the common channel is a channel on which all electronic devices support P2P connection establishment. Usually, a common channel in a 2.4G band, such as a channel 1, a channel 6, or a channel 11 in the 2.4G band, is selected. The first device and the second device first establish the P2P connection through the common channel. This can ensure that the first device and the second device successfully establish the P2P connection, so that the first device and the second device exchange information by using a P2P connection channel.

In addition, the P2P connection established between the first device and the second device in this step may be understood as a temporary connection.

S502. The first device obtains a Wi-Fi module intra-band inter-channel switching capability value.

S503. The second device obtains a Wi-Fi module intra-band inter-channel switching capability value.

In this embodiment, for content of step S502 and step S503, refer to content of step S401 and step S402 in Embodiment 1. Details are not described herein again.

It should be further noted that step S502 and step S503 may not be limited to the execution location shown in FIG. 5. Alternatively, after the first device and the second device complete device discovery, step S502 and step S503 are performed before step S501 is performed. Certainly, after the first device and the second device complete device discovery, the first device and the second device alternatively perform step S501, and step S502 and step S503 in parallel.

S504. The first device sends capability information of the first device and a STA channel through which the first device accesses a network to the second device by using a P2P connection channel, where the capability information of the first device includes the Wi-Fi module intra-band inter-channel switching capability value of the first device.

S505. The second device sends capability information of the second device and a STA channel through which the second device accesses the network to the first device by using the P2P connection channel, where the capability information of the second device includes the Wi-Fi module intra-band inter-channel switching capability value of the second device.

In this embodiment, the first device and the second device establish the P2P connection by performing step S501. Therefore, the first device and the second device may exchange the capability information and the STA channels of the first device and the second device by using the established P2P connection channel.

Same as that in Embodiment 1, one of step S504 and step S505 may not be performed. In some embodiments, only a device that determines, by using the Wi-Fi module intra-band inter-channel switching capability values of the first device and the second device, a channel for establishing a formal P2P connection between the first device and the second device receives capability information of a peer device and a STA channel through which the peer device accesses the network that are sent by the peer device.

S506. The first device determines a device with a weaker switching capability in the first device and the second device by using the Wi-Fi module intra-band inter-channel switching capability value of the first device and the Wi-Fi module intra-band inter-channel switching capability value of the second device, and uses a STA channel of the determined device as a channel for establishing a P2P connection.

In this embodiment, for a specific implementation process of step S506, refer to content of step S406 in Embodiment 1. Details are not described herein again.

S507. The first device sends a notification message to the second device, to notify the second device to disconnect the P2P connection between the first device and the second device and establish a P2P connection by using the selected channel for establishing a P2P connection.

In some embodiments, the notification message sent by the first device to the second device may carry the channel selected by the first device for establishing a P2P connection.

S508. The first device and the second device establish a P2P connection by using the selected P2P connection channel.

The first device and the second device disconnect the temporary P2P connection established in step S501, and reestablish a P2P connection by using the selected P2P connection channel.

It should be further noted that, before establishing the P2P connection by using the selected channel for establishing a P2P connection, the first device and the second device need to determine that the selected channel for establishing a P2P connection is a channel supported by the first device and the second device.

Based on this, the first device obtains a channel supported by the first device and a channel supported by the second device. In some embodiments, the capability information of the second device that is sent by the second device to the first device may further include the channel supported by the second device. The first device obtains, from the capability information of the second device, the channel supported by the second device.

It should be further noted that the capability information of the first device that is sent by the first device to the second device may also include the channel supported by the first device. The second device may also obtain, from the capability information of the first device, the channel supported by the first device.

The first device performs step S406 to obtain the STA channel of the device with the weaker switching capability in the first device and the second device, compares the STA channel with a channel supported by a device with a stronger switching capability in the first device and the second device, determines whether the STA channel is the channel supported by the device with the stronger switching capability in the first device and the second device, and performs step S407 if determining that the STA channel is the channel supported by the device with the stronger switching capability in the first device and the second device.

If it is determined that the STA channel is not the channel supported by the device with the stronger switching capability in the first device and the second device, whether a STA channel of the device with the stronger switching capability in the first device and the second device is a channel supported by the device with the weaker switching capability in the first device and the second device is determined. If it is determined that the STA channel of the device with the stronger switching capability in the first device and the second device is a channel supported by the device with the weaker switching capability in the first device and the second device, the STA channel of the device with the stronger switching capability in the first device and the second device is used as the channel for establishing a P2P connection between the first device and the second device, and the foregoing step S407 is performed.

If it is determined that the STA channel of the device with the stronger switching capability in the first device and the second device is not a channel supported by the device with the weaker switching capability in the first device and the second device, the first device selects, from the channel supported by the first device and the channel supported by the second device, a channel supported by both the first device and the second device as the channel for establishing a P2P connection, and performs the foregoing step S407.

It should be further noted that, if the first device and the second device find, in a process of establishing a P2P connection by using the channel selected in step S406 for establishing a P2P connection, that the P2P connection establishment fails, it indicates that one of the first device and the second device does not support the channel, and the first device and the second device need to reestablish a P2P connection by using another channel.

In some embodiments, the first device determines whether the first device and the second device successfully establish the P2P connection by using the selected channel for establishing a P2P connection. If the first device determines that the P2P connection fails, the first device uses the STA channel of the device with the stronger switching capability in the first device and the second device as a channel for establishing a P2P connection, and reestablishes a P2P connection.

If the first device and the second device still do not successfully establish a P2P connection by using the STA channel of the device with the stronger switching capability, the first device selects, from the channel supported by the first device and the channel supported by the second device, a channel supported by both the first device and the second device as a channel for establishing a P2P connection.

In some embodiments, in step S504, the capability information of the first device may further include the channel supported by the first device. Similarly, in step S505, the capability information of the second device may further include the channel supported by the second device. The first device finds, through screening from the channel supported by the first device and the channel supported by the second device, a channel supported by both the first device and the second device as a channel for establishing a P2P connection.

It should be further noted that, in some embodiments, the first device may determine, in a manner of sending a request to the second device and receiving a response returned by the second device, whether the P2P connection between the first device and the second device succeeds.

If the first device sends the request to the second device and receives, within specified duration, the response returned by the second device, the first device determines that the first device and the second device successfully establish the P2P connection; on the contrary, the first device determines that the first device and the second device fail to establish the P2P connection.

Another embodiment of this application further provides a computer-readable storage medium. The computer-readable storage medium stores instructions. When the instructions are run on a computer or processor, the computer or processor is enabled to perform one or more steps in any one of the foregoing methods.

Another embodiment of this application further provides a computer program product including instructions. When the computer program product runs on a computer or processor, the computer or processor is enabled to perform one or more steps in any one of the foregoing methods.

What is claimed is:

1. A Wireless Fidelity (Wi-Fi) Peer-To-Peer (P2P) connection method, applied to a first device, wherein the first device and a second device access a network by using different channels in a same band, and the Wi-Fi P2P connection method comprises:

obtaining, by the first device, a first Wi-Fi module intra-band inter-channel switching capability of the first device, and establishing a connection channel with the second device;

receiving, by the first device, a second Wi-Fi module intra-band inter-channel switching capability of the second device and a station (STA) channel through which the second device accesses the network that are sent by the second device through the connection channel established with the first device;

determining, by the first device, which of the first device and the second device has a weaker switching capability according to the first Wi-Fi module intra-band inter-channel switching capability and the second Wi-Fi module intra-band inter-channel switching capability; and establishing, by the first device, a Wi-Fi P2P connection with the second device according to the STA channel through which the second device accesses the network when it is determined that the second device has the weaker switching capability than the first device.

2. The Wi-Fi P2P connection method according to claim 1, wherein the first Wi-Fi module intra-band inter-channel switching capability comprises three values: a P2P channel working duration of the first device, a STA channel working duration of the first device, and a switching-consumed time of the first device; and wherein the second Wi-Fi module intra-band inter-channel switching capability comprises three values: a P2P channel working duration of the second device, a STA channel working duration of the second device, and a switching-consumed time of the second device.

3. The Wi-Fi P2P connection method according to claim 1, wherein the first Wi-Fi module intra-band inter-channel switching capability comprises a first value, and the first value represents the Wi-Fi module intra-band inter-channel switching capability of the first device; and wherein the second Wi-Fi module intra-band inter-channel switching capability comprises a second value, and the second value represents the Wi-Fi module intra-band inter-channel switching capability of the second device; and wherein determining, by the first device, which of the first device and the second device has the weaker switching capability according to the first Wi-Fi module intra-band inter-channel switching capability and the second Wi-Fi module intra-band inter-channel switching capability comprises:

comparing, by the first device, the first value with the second value, and determining which of the first device and the second device has the weaker switching capability according to which of the first value and the second value is smaller.

4. The Wi-Fi P2P connection method according to claim 2, wherein determining, by the first device, which of the first device and the second device has the weaker switching capability according to the first Wi-Fi module intra-band inter-channel switching capability and the second Wi-Fi module intra-band inter-channel switching capability comprises:

separately comparing, by the first device, the P2P channel working duration of the first device with the P2P channel working duration of the second device, the STA channel working duration of the first device with the STA channel working duration of the second device, and the switching-consumed time of the first device with the switching-consumed time of the second device, to obtain three comparison results; and determining, by the first device, which of the first device and the second device has the weaker switching capability according to the three comparison results.

5. The Wi-Fi P2P connection method according to claim 1, wherein receiving, by the first device, the second Wi-Fi module intra-band inter-channel switching capability of the second device and the STA channel through which the second device accesses the network that are sent by the second device through the connection channel established with the first device, comprises:

receiving, by the first device through a Bluetooth connection channel or a P2P connection channel, the second Wi-Fi module intra-band inter-channel switching capability of the second device and the STA channel through which the second device accesses the network that are sent by the second device, wherein the P2P connection channel is obtained by the first device and the second device by establishing a P2P connection through a common channel.

6. The Wi-Fi P2P connection method according to claim 1, further comprising:

when the first device determines that the second device has the weaker switching capability than the first device, and the STA channel through which the second device accesses the network is not supported by the first device, establishing, by the first device, a P2P connection between the first device and the second device by using a STA channel through which the first device accesses the network; or when the first device determines that the first device has the weaker switching capability than the second device and the STA channel through which the first device accesses the network is not supported by the second device, establishing, by the first device, a P2P connection between the first device and the second device by using a STA channel through which the second device accesses the network.

7. The Wi-Fi P2P connection method according to claim 6, further comprising:

before establishing, by the first device, the P2P connection between the first device and the second device by using the STA channel through which the first device accesses the network, determining, by the first device, that the STA channel through which the first device accesses the network is a channel supported by the second device; or before establishing, by the first device, the P2P connection between the first device and the second device by using the STA channel through which the second device accesses the network, determining, by the first device, that the STA channel through which the second device accesses the network is a channel supported by the first device.

8. The Wi-Fi P2P connection method according to claim 7, further comprising:

when the first device determines that the STA channel through which the first device accesses the network is not a channel supported by the second device, establishing, by the first device, a P2P connection between the first device and the second device by using a channel supported by both the first device and the second device; or when the first device determines that the STA channel through which the second device accesses the network is not a channel supported by the first device, establishing, by the first device, a P2P connection between the first device and the second device by using a channel supported by both the first device and the second device.

9. The Wi-Fi P2P connection method according to claim 1, the method further comprising:

after establishing, by the first device, the P2P connection between the first device and the second device by using the STA channel through which the second device accesses the network when it is determined that the second device has the weaker switching capability than the first device, when the first device determines that the P2P connection between the first device and the second device is not successfully established, establishing, by the first device, a P2P connection between the first device and the second device by an STA channel through which the first device accesses the network.

10. The Wi-Fi P2P connection method according to claim 9, wherein after establishing, by the first device, the P2P connection between the first device and the second device by using the STA channel through which the first device accesses the network, the method further comprises:

when the first device determines that the P2P connection between the first device and the second device is not successfully established, establishing, by the first device, a P2P connection between the first device and the second device by using a channel supported by both the first device and the second device.

11. An electronic device, configured to act as a first device, and the electronic device comprising:

one or more processors, a memory, and a wireless communications interface, wherein the memory and the wireless communications interface are coupled to the one or more processors, the memory is configured to stores computer program code, the computer program code comprises computer instructions, and when the one or more processors execute the computer instructions, the electronic device performs the following:

obtaining a first Wireless Fidelity (Wi-Fi) module intra-band inter-channel switching capability of the first device, and establishing a connection channel with a second device;

receiving a second Wi-Fi module intra-band inter-channel switching capability of the second device and a station (STA) channel through which the second device accesses a network that are sent by the second device through the connection channel established with the first device;

determining which of the first device and the second device has a weaker switching capability according to the first Wi-Fi module intra-band inter-channel switching capability and the second Wi-Fi module intra-band inter-channel switching capability; and establishing a Wi-Fi Peer-To-Peer (P2P) connection with the second device according to the STA channel through which the second device accesses the network when it is determined that the second device is the device has the weaker switching capability than the first device.

12. The electronic device according to claim 11, wherein the first Wi-Fi module intra-band inter-channel switching capability comprises three values: a P2P channel working duration of the first device, a STA channel working duration of the first device, and a switching-consumed time of the first device; and wherein the second Wi-Fi module intra-band inter-channel switching capability comprises three values: a P2P channel working duration of the second device, STA channel working duration of the second device, and switching-consumed time of the second device.

13. The electronic device according to claim 11, wherein the first Wi-Fi module intra-band inter-channel switching capability comprises a first value, and the first value represents the Wi-Fi module intra-band inter-channel switching capability of the first device;

wherein the second Wi-Fi module intra-band inter-channel switching capability comprises a second value, and the second value represents the Wi-Fi module intra-band inter-channel switching capability of the second device; and wherein determining which of the first device and the second device has the weaker switching capability by using the first Wi-Fi module intra-band inter-channel switching capability and the second Wi-Fi module intra-band inter-channel switching capability comprises:

comparing the first value with the second value, and determining which of the first device and the second device has the weaker switching capability according to which of the first value and the second value is smaller.

14. The electronic device according to claim 12, wherein determining, by the first device, the weaker switching capability which of the first device and the second device has the weaker switching capability according to the first Wi-Fi module intra-band inter-channel switching capability and the second Wi-Fi module intra-band inter-channel switching capability comprises:

separately comparing the P2P channel working duration of the first device with the P2P channel working duration of the second device, the STA channel working duration of the first device with the STA channel working duration of the second device, and the switching-consumed time of the first device with the switching-consumed time of the second device, to obtain three comparison results; and determining which of the first device and the second device has the weaker switching capability according to the three comparison results.

15. The electronic device according to claim 11, wherein receiving the second Wi-Fi module intra-band inter-channel switching capability of the second device and the STA channel through which the second device accesses the network that are sent by the second device comprises:

receiving, through a Bluetooth connection channel or a peer to peer (P2P) connection channel, the second Wi-Fi module intra-band inter-channel switching capability of the second device and the STA channel through which the second device accesses the network that are sent by the second device, wherein the P2P connection channel is obtained by the first device and the second device by establishing a P2P connection through a common channel.

16. The electronic device according to claim 15, wherein when the one or more processors execute the computer instructions, the electronic device performs the following:

when the first device determines that the second device has the weaker switching capability than the first device, and the STA channel through which the second device accesses the network is not supported by the first device, establishing a P2P connection between the first device and the second device by using a STA channel through which the first device accesses the network; or when the first device determines that the first device has the weaker switching capability than the second device and the STA channel through which the first device accesses the network is not supported by the second device, establishing a P2P connection between the first device and the second device by using a STA channel through which the second device accesses the network.

17. The electronic device according to claim 16, wherein when the one or more processors execute the computer instructions, the electronic device performs the following:

before establishing the P2P connection between the first device and the second device by using the STA channel through which the first device accesses the network, determining that the STA channel through which the first device accesses the network is a channel supported by the second device; or before establishing the P2P connection between the first device and the second device by using the STA channel through which the second device accesses the network, determining that the STA channel through which the second device accesses the network is a channel supported by the first device.

18. The electronic device according to claim 17, wherein when the one or more processors execute the computer instructions, the electronic device performs the following:

when the first device determines that the STA channel through which the first device accesses the network is not a channel supported by the second device, establishing a P2P connection between the first device and the second device by using a channel supported by both
the first device and the second device; or
when the first device determines that the STA channel
through which the second device accesses the network
is not a channel supported by the first device, estab-
lishing a P2P connection between the first device and
the second device by using a channel supported by both
the first device and the second device.

19. The electronic device according to claim 11, wherein
when the one or more processors execute the computer
instructions, the electronic device performs the following:
after establishing the P2P connection between the first
device and the second device by using the STA channel
through which the second device accesses the network
when it is determined that the second device has the
weaker switching capability than the first device, when
the first device determines that the P2P connection
between the first device and the second device is not successfully established, establishing a P2P connection
between the first device and the second device by using
an STA channel through which the first device accesses
the network.

20. The electronic device according to claim 19, wherein
when the one or more processors execute the computer
instructions, the electronic device performs the following:
after establishing the P2P connection between the first
device and the second device by using the STA channel
through which the first device accesses the network
when the first device determines that the P2P connec-
tion between the first device and the second device is
not successfully established, establishing the P2P con-
nection between the first device and the second device
by using a channel supported by both the first device
and the second device.

* * * * *